United States Patent
Fleureau et al.

(10) Patent No.: US 12,283,021 B2
(45) Date of Patent: Apr. 22, 2025

(54) METHOD AND APPARATUS TO ENCODE AND DECODE IMAGES OF POINTS OF A SPHERE

(71) Applicant: InterDigital VC Holdings, Inc., Wilmington, DE (US)

(72) Inventors: Julien Fleureau, Rennes (FR); Bertrand Chupeau, Rennes (FR); Renaud Dore, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 318 days.

(21) Appl. No.: 17/415,931

(22) PCT Filed: Dec. 18, 2019

(86) PCT No.: PCT/US2019/067030
§ 371 (c)(1),
(2) Date: Jun. 18, 2021

(87) PCT Pub. No.: WO2020/131984
PCT Pub. Date: Jun. 25, 2020

(65) Prior Publication Data
US 2022/0084162 A1 Mar. 17, 2022

(30) Foreign Application Priority Data
Dec. 21, 2018 (EP) .................................... 18306804

(51) Int. Cl.
*G06T 3/073* (2024.01)
*G06T 3/40* (2024.01)
*G06T 9/00* (2006.01)

(52) U.S. Cl.
CPC .............. *G06T 3/073* (2024.01); *G06T 3/40* (2013.01); *G06T 9/001* (2013.01)

(58) Field of Classification Search
CPC ......... G06T 3/0043; G06T 3/40; G06T 9/001; G06T 3/0062; H04N 19/597; H04N 19/53; H04N 19/54
See application file for complete search history.

(56) References Cited

U.S. PATENT DOCUMENTS 4,367,946 A * 1/1983 Varner ............... G06K 15/1295
355/1
10,346,998 B1 * 7/2019 Anderberg ................ G06T 7/11
(Continued)

FOREIGN PATENT DOCUMENTS

| CN | 105631809 A | 6/2016 |
|----|-------------|--------|
| CN | 105931190 A | 9/2016 |

(Continued)

OTHER PUBLICATIONS

English Translation for WO2018133381, as entitled: Asymmetric mapping method for panoramic images.
(Continued)

Primary Examiner — Charles T Shedrick
(74) Attorney, Agent, or Firm — VOLPE KOENIG (57) ABSTRACT

Methods and devices are provided to encode points of a sphere onto an image by projecting them as a function of an isotropic region guided mapping operator and/or to decode pixels of an image onto a sphere by de-projected them according to the same parametrized mapping operator. A region of interest is determined on the sphere and the angular resolution of pixels of the image is modulated as a function of their distance to the reference pixel corresponding to the center of the region of interest. Chosen angular resolutions and size of the region of interest are associated with the image and encoded in a stream.

16 Claims, 5 Drawing Sheets

(56) References Cited

U.S. PATENT DOCUMENTS

| | | |
|---|---|---|
| 2005/0200927 A1* | 9/2005 | Brotherton-Ratcliffe .................... G03H 1/26 359/21 |
| 2007/0127101 A1 | 6/2007 | Oldroyd |
| 2015/0350678 A1 | 12/2015 | Shimizu et al. |
| 2018/0007389 A1 | 1/2018 | Izumi |
| 2018/0109810 A1 | 4/2018 | Xu et al. |
| 2019/0149844 A1 | 5/2019 | Choi et al. |
| 2021/0012454 A1* | 1/2021 | Tezaur ...................... G06T 3/60 |
| 2023/0205753 A1* | 6/2023 | Laska .................... G06V 20/54 348/208.1 |

FOREIGN PATENT DOCUMENTS

| | | |
|---|---|---|
| CN | 106231317 A | 12/2016 |
| CN | 107409231 A | 11/2017 |
| CN | 108012153 A | 5/2018 |
| EP | 3267688 A1 | 1/2018 |
| WO | 2017200259 A1 | 11/2017 |
| WO | 2018059868 A1 | 4/2018 |
| WO | 2018133381 A1 | 7/2018 |
| WO | 2018154130 A1 | 8/2018 |
| WO | WO-2023081404 A1 * | 5/2023 |

OTHER PUBLICATIONS

English Translation for CN105631809, as entitled: A kind of non-uniform resolution spherical panorama drawing generating method.

* cited by examiner

METHOD AND APPARATUS TO ENCODE AND DECODE IMAGES OF POINTS OF A SPHERE

This application claims the benefit, under 35 U.S.C. § 371 of International Application PCT/US2019/067030, filed Dec. 18, 2019, which was published in accordance with PCT Article 21(2) on Jun. 25, 2020, in English, and which claims the benefit of European Patent Application No. 18306804.8, filed Dec. 21, 2018.

1. TECHNICAL FIELD

The present principles generally relate to encoding a three-dimensional scene onto an image, to a stream format comprising this image and related metadata and to the decoding of this image to re-build the three-dimensional scene. Particularly, but not exclusively, the technical field of the present principles is related to encode, transmit and decode volumetric videos which allow users to experience parallax, for example by using a Head-Mounted Display (HMD) device.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Immersive videos, also called 360° videos, allow the user to watch all around himself through rotations around a fixed point of view. Ways to convey such videos differ by the chosen mapping operator. A mapping operator maps the three-dimensional (3D) points of the viewing sphere on a two-dimensional (2D) plane which allows to convey the 3D angular information in a video frame. Several mapping operators have been proposed like Equi-Rectangular Projection (ERP) or other spherical projections widely used in geography, Cube Map Projection (CMP) or different pyramidal projections.

Volumetric videos are an extension of the immersive videos: in addition to rotations of the head, the user may translate his head position within a limited space around a view point and experience parallax. Such videos increase the feeling of immersion and the perception of the scene depth and prevent from dizziness by providing consistent visual feedback during head translations. A possible format to convey volumetric videos makes use of color and depth atlases of patches, each patch being also obtained as a mapping of a part of the surrounding 3D space.

The choice of a mapping operator is based on its ability to generate codec-friendly images, on the ease to pack or compute the resulting mapping or even, on the amount of visual distortion that such a mapping generates (which is related to its ability to fit video codec properties). Very few mapping operators intrinsically address the problem of generating images with adaptive and adapted angular density of pixels for a better control over the image quality. In addition, like in any video, it is usual that only a region of the frame. It is even more true in 360° or volumetric videos wherein a gaze direction within the scene concentrates the topic of the video, the part of interest of the subject matter of the story. Such regions of interest within the encoded frame deserve a high quality of encoding for a better rendering after decoding.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising projecting points of an area of a sphere onto a pixel of an image. The surface of the area is a function of a distance between the pixel and a reference pixel of the image in both dimensions of the image plane. This surface varies in an isotropic manner according to the distance.

According to an embodiment, the surface is a function of coordinates of said reference pixel corresponding to a reference point on the sphere, an angular window around the reference point, an angular resolution at said reference pixel, and an angular resolution at pixels corresponding to border of said angular window.

The present principles also relate to a method for generating a stream comprising the image obtained by the previous method and parameters representative of the mapping operator used to project points of the sphere onto the image. The present principles also relate to a device comprising a processor implement such methods.

The present principles also relate to a method and to a device to decode an image generated according to the previous methods and to de-projects pixels of such an image onto a sphere by using an inverse mapping operator determined as a function of parameters associated with the image to decode.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

Figure 1A:
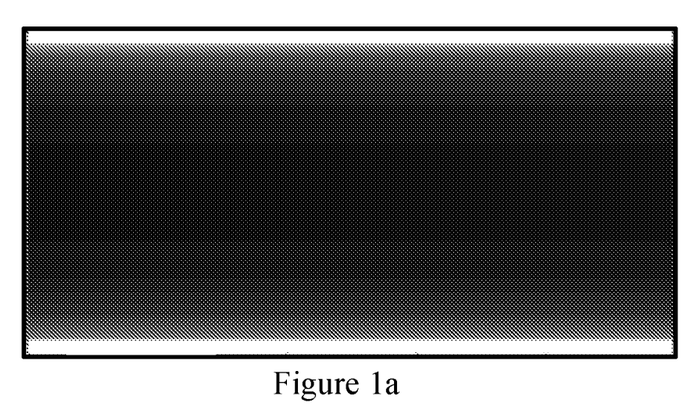
FIG. 1a illustrates the pixel density of an equirectangular projection mapping.
Figure 1B:
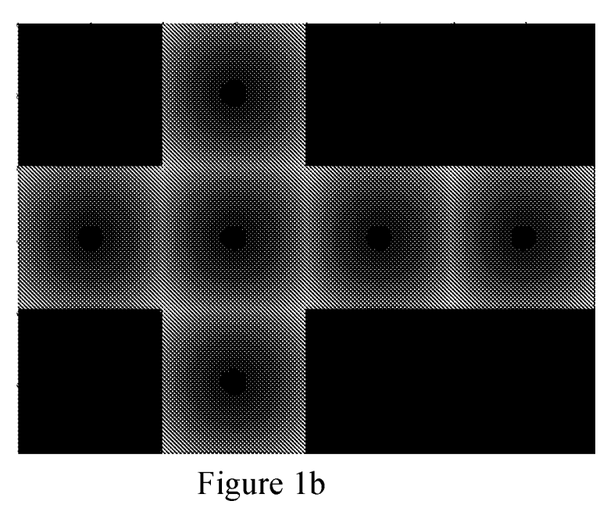
FIG. 1b illustrates the pixel density of a cube mapping.

To encode a 3D scene as an image (associated with metadata), the choice of a mapping operator is key. Different mapping operators have different technical effects on the ability of the generated image to be compressed and to convey data accuracy and quality for decoding. For example, spherical mapping operators (e.g. ERP) allocate different amounts of pixels to different regions of the 3D space (e.g. more pixels are allocated to the polar areas which are rarely looked at by the user and less pixels to the equatorial part which usually comprises the regions of interest). In other words, the most relevant parts of the image are associated with a lower quality. A same observation can be made for a cubic projection where the highest quality is obtained at the face edges. FIG. 1a illustrates the pixel density of an ERP mapping, the brightest the denser. It is clear from this figure that the density at poles (i.e. the upper and the lower part of the image) concentrate a very dense information comparatively to the equatorial zone in the middle. The density for a pixel corresponds to the size of the solid angle of the 3D space projected onto this pixel. With an ERP mapping, a pixel at a pole receives information about points of the 3D scene comprised in a solid angle of the 3D space, smaller than a pixel at the equator. In other words, the information received by a pixel at a pole is more detailed than the information received by a pixel at the equator. Yet, the most relevant part of the 3D scene is rarely located at poles. FIG. 1b illustrates the pixel density of a cube mapping, the brightest the denser. With this mapping operator, a higher pixel density is provided to pixels at the border of the cube faces than to pixels at the center of the cube faces. Yet, the relevant part of the 3D scene is preferably located at the center of the cube faces because some stitching artifacts may appear at the borders when reconstructing the 3D scene from the image.

An embodiment for a method for generating an image representative of a 3D scene consists in splitting a parent projection (e.g. ERP) into multiple portions, remapping each portion into different parts of the final image with different sizes. Such an embodiment mimics an adaptive resolution, either to counter the drawbacks of some approaches (e.g. remapping the polar areas of an ERP into a smaller and more adapted rectangle) or to enhance certain parts (e.g. by remapping the central part of interest on bigger areas). However, such an approach suffer from strong discontinuities at the borders of each sub-rectangle which may cause visual artifacts in the reconstructed viewport.

Another embodiment consists in applying a weighted offset to an operator of projection according to a reference direction in the 3D space. The reference direction (which is associated to a pixel of the image according to the chosen mapping operator) may point to a part of the 3D scene estimated at relevant in the 3D scene (e.g. the direction of the user gaze or the direction of a main object in the scene). The obtained adapted projection reshapes the mapping distribution to fit the new direction and the associated weight controls the gain in terms of pixel density. However, if such a mapping operator tends to increase pixel density at a region of interest (i.e. around the reference direction), the region of interest is only defined by the reference direction and a weight. There is no notion of angular window of interest. Moreover, the drawbacks of the base operator in terms of angular distribution are not overcome (e.g. polar areas for the ERP or edges for the CMP are denser than center areas of the images).

According to the present principles, an advantageous embodiment for a method for generating an image representative of a 3D scene is provided hereafter. A continuous spherical mapping operator is described. This mapping operator permits to define a Region Of Interest (ROI) as an angular window where the pixel density may be controlled. The decrease of resolution from the center of the ROI to its diametrical opposite is isotropic regarding the distance to the region of interest. The decrease of resolution on the ROI itself is guided by a unique normalized parameter. On the encoding side, the ROI and a resolution profile are obtained. A set of five floating parameters are then generated that fully characterizes the projection operator. A data stream is generated, the data stream comprising these five floating parameters, for example as metadata, and images representative of the 3D scene obtained by using this parametrized mapping operator. At the decoding side, the decoder implements a decoding method, using the five parameters to parametrize an inverse mapping operator for reconstruction the 3D scene from the images comprised in the data stream.

Such a new operator, by advantageously sampling the sphere also frees some space in the mapping rectangle of the generated image frames. This space may advantageously be used to receive some additional information such as patches of a 3 DoF+ atlas, for instance.

A spherical mapping operator is an application $M:[0,W]\times[0,H]\rightarrow S3$ defined as a bijective mapping from the 2D plan of a W×H image to the unit 3-sphere (i.e. a higher-dimensional analogue of a sphere. It may be embedded in 4-dimensional Euclidean space as the set of points equidistant from a fixed central point). Such a mapping can be formalized by:

$$M:(u,v)\rightarrow \begin{bmatrix} \cos(\phi(u,v))\sin(\theta(u,v)) \\ \sin(\phi(u,v)) \\ \cos(\phi(u,v))\cos(\theta(u,v)) \end{bmatrix} \quad \text{Eq1}$$

Where $\theta:[0,W]\times[0,H]\rightarrow[-\pi,\pi]$ and $\phi:[0,W]\times[0,H]\rightarrow[-\frac{\pi}{2},\frac{\pi}{2}]$ So the design of a spherical mapping operator boils down to defining the couple of functions $(\theta,\phi)$ according to the constraints and/or objective of the considered problem.

The elementary surface $\partial^2 S_M(u,v)$ associated with the mapping M in (u,v) space which represents the area of an elementary square deformed by the mapping M on the sphere is defined as:

$$\partial^2 S_M(u,v) = \left\| \frac{\partial M}{\partial u}(u,v) \bigwedge \frac{\partial M}{\partial u}(u,v) \right\| \quad \text{Eq2}$$

and may be rewritten making use of the spherical parametrization as:

$$\partial^2 S_M(u,v) = \cos(\phi(u,v)) \begin{vmatrix} \frac{\partial \theta}{\partial u}(u,v) & \frac{\partial \phi}{\partial u}(u,v) \\ \frac{\partial \theta}{\partial u}(u,v) & \frac{\partial \phi}{\partial u}(u,v) \end{vmatrix} \quad \text{Eq3}$$

The local angular resolution $\xi_M^{sr}(u,v)$ associated with the mapping M in (u,v) space expressed in pixel per steradian is defined by:

$$\overline{\xi}_M^{sr}(u,v) = \frac{1}{\partial^2 S_M(u,v)} \quad \text{Eq4a}$$

or, expressed in pixel per degree:

$$\overline{\xi}_M^{\circ}(u,v) = \frac{\pi}{180\sqrt{\partial^2 S_M(u,v)}} \quad \text{Eq4b}$$

In equation Eq3, the elementary surface is not a linear function of the Jacobian Determinant of the spherical parametrization because of the additional term $\cos(\phi(u,v))$. This coefficient is related to the anisotropy of the distribution of pixels in a spherical parametrization along the circle of latitude and longitude.

Figure 2A:
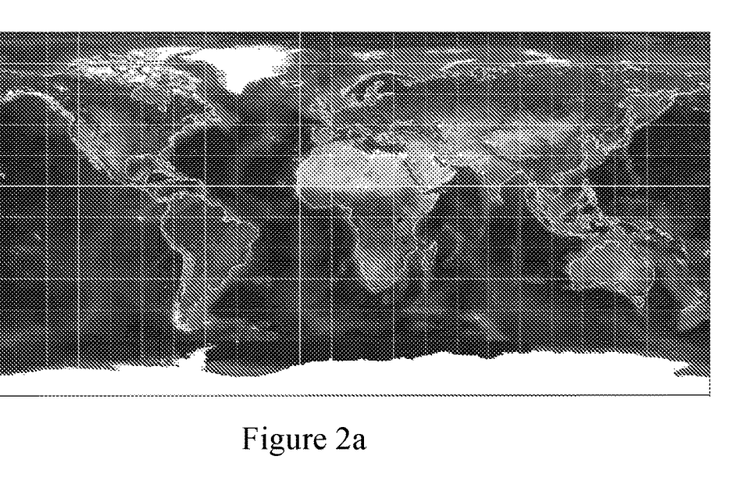
FIG. 2a shows an equirectangular projection map of a sphere representing the Earth.
Figure 2B:
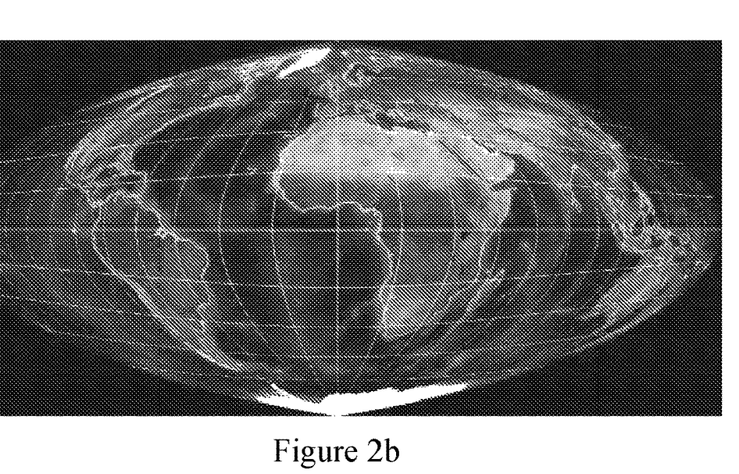
FIG. 2b shows a map of a sphere representing the Earth according to a mapping operator determined according to a non-restrictive embodiment of the present principles.

FIG. 2a shows an ERP map of a sphere representing the Earth. FIG. 2b shows a map of a sphere representing the Earth according to a mapping operator determined according to the present principles.

Figure 2C:
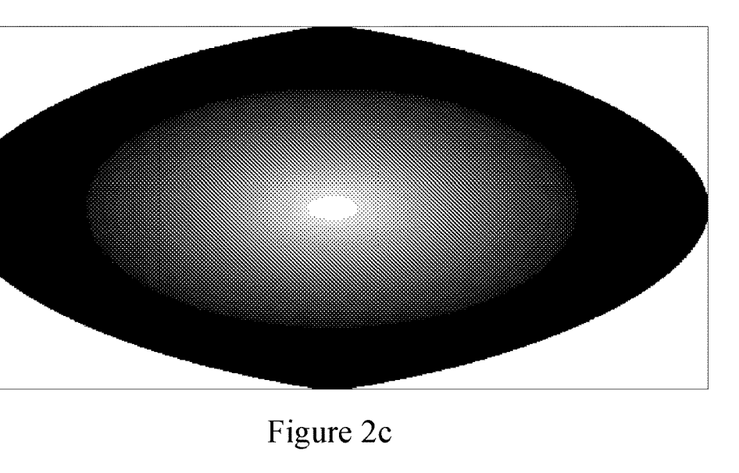
FIG. 2c illustrates the angular resolution of an image obtained by projecting points of a sphere onto an image with a mapping operator determined according to a non-restrictive embodiment of the present principles.

FIG. 2c illustrates the angular resolution of an image obtained by projecting points of a sphere onto an image with a mapping operator M defined according to a particular embodiment of the present principles. Mapping operator M allows to consider a region of interest (ROI) where the angular resolution is controlled. The angular resolution at the center of the ROI is determined to a wanted angular resolution $\Xi$. The ROI is defined by its center and an angular window $[-\Theta,\Theta]\times[-\Phi,\Phi]$ on the sphere around the center. By using mapping operator M, the angular resolution is decreasing in an isotropic manner, from the center of the ROI to the border. In an embodiment, the angular resolution keeps varying in an isotropic manner beyond to the border of the ROI. In another embodiment, the angular resolution is constant outside the ROI, for example, equal to the angular resolution at border of the angular window that determine the ROI around its center.

The center of the ROI corresponds to a direction in the 3D space, that is a point of the sphere. This direction or point correspond to a given pixel of the image, called center pixel, according to mapping operator M. Without loss of generality, we assume that the ROI is centered in the image, that is at coordinates x=W/2, y=H/2, where W is the width of the image and H the height of the image. A rotation of the axis is sufficient to center the scene in the direction of interest. In the following, $[-\Theta,\Theta]\times[\Phi,\Phi]$ is the angular window of interest (with $\Theta\in[0,\pi]$ and $\Phi\in[0,\pi/2]$). $\Xi$ is the desired resolution at the center of the ROI (in pixel per degree) and $\nu$ the desired relative amount of resolution loss at the "border" of the ROI (expressed in percentage of the central resolution). If the angular window covers the entire sphere, that is the angular window equals $$[-\pi, \pi] \times \left[\frac{-\pi}{2}, \frac{\pi}{2}\right],$$

the ROI corresponds to the entire scene. If the ν equals 1, that is if the angular resolution at border of the ROI is the same than the angular resolution at the center of the ROI, the resulting mapping is isotropic, that is every pixel of the generated image has the same angular resolution Ξ. So, $$\partial^2 S = \left(\frac{\pi}{180\Xi}\right)^2$$

is the elementary surface at the center of the ROI. Mapping operator M according to an embodiment of the present principles is defined by equations Eq5a and Eq5b.

$$\theta(x, y) = \sqrt{K}\, x \exp\left(\frac{\alpha}{2}\left(\frac{x^2}{a^2} + \frac{y^2}{b^2}\right)^\beta\right) \quad \text{Eq5a}$$

$$\Phi(x, y) = \sqrt{K}\, y \exp\left(\frac{\alpha}{2}\left(\frac{x^2}{a^2} + \frac{y^2}{b^2}\right)^\beta\right) \quad \text{Eq5b}$$

where K, a, b, α, β are parameters representative of the angular window, of the angular resolution at the center pixel and of the angular resolution at border of said angular window. Without loss of generality, Eq5a and Eq5b are set with the center pixel is at the center of the image. These five parameters define the spherical mapping operator M of the present principles and satisfy the following constraints:

$$\partial^2 S_{M^{IRGM}}\left(\frac{W}{2}, \frac{H}{2}\right) = \partial^2 S_{central} = K \quad \text{(Central Condition)},$$

$$\theta_n^{IRGM}(a, 0) = \Theta_n = \sqrt{K}\, a \exp\left(\frac{\alpha}{2}\right) \quad \text{(Longitudinal Anchor Condition)},$$

$$\theta_n^{IRGM}(0, b) = \Phi_n = \sqrt{K}\, b \exp\left(\frac{\alpha}{2}\right) \quad \text{(Latitudinal Anchor Condition)},$$

$$\partial^2 M_{border}^{IRGM} =$$

$$\partial^2 M_{\frac{x^2}{a^2} + \frac{y^2}{b^2} = 1}^{IRGM} = \frac{\partial^2 S_{central}}{\nu^2} = K \exp(\alpha(1 + \alpha\beta)) \quad \text{(Border Condition)},$$

$$\max(\theta_n^{IRGM}(1, 0), \phi_n^{IRGM}(0, 1)) =$$

$$\sqrt{K} \exp\left(\frac{\alpha}{2\min^{(2\% \, beta)}(a, b)}\right) = 1 \quad \text{(Coverage Condition)}.$$

According to Eq5a and Eq5b, the elementary surface is varying in an isotropic manner from the center of the ROI to the border of the angular window of the ROI. Indeed, the elementary surface (which is the inverse of the angular resolution) is a function of the distance $$\left(\frac{x^2}{a^2} + \frac{y^2}{b^2}\right)$$

from the center to borders of the ROI. If the chosen angular resolution at center pixel is higher than the angular resolution chosen at border of the angular window of the ROI, then the elementary surface is increasing (and so the angular resolution is decreasing), and reciprocally.

In a preferred embodiment, the center pixel, also called reference pixel in the present description, is at the center of the image and it is not necessary to associate the coordinates of the center pixel with the image, the retrieving of the sphere by de-projecting pixels of the image using the center of the image as coordinates of the center pixel by default. In another embodiment, the center of the ROI is located in a different direction and coordinates of the associated center pixel in the image according to the mapping operator are associated with the image.

Knowing the 5 parameters K, a, b, α, and β, the mapping operator may be inversed making use of few Newton iterations for retrieving the sphere by de-projecting pixels of the image according to the inverse mapping operator.

Figure 3A:
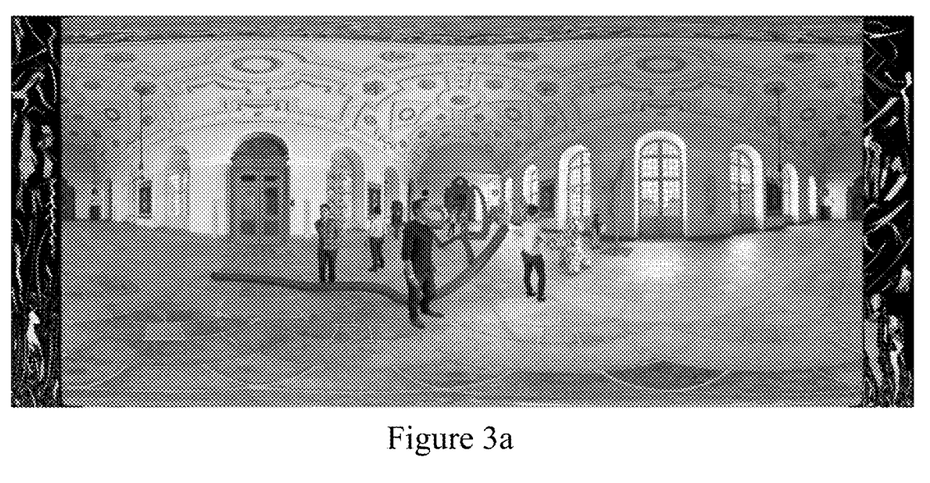
FIG. 3a shows an image obtained by projecting color points of a sphere onto pixel of the image according the equirectangular projection mapping.

FIG. 3a shows an image obtained by projecting color points of a sphere onto pixel of the image according the equirectangular projection mapping.

Figure 3B:
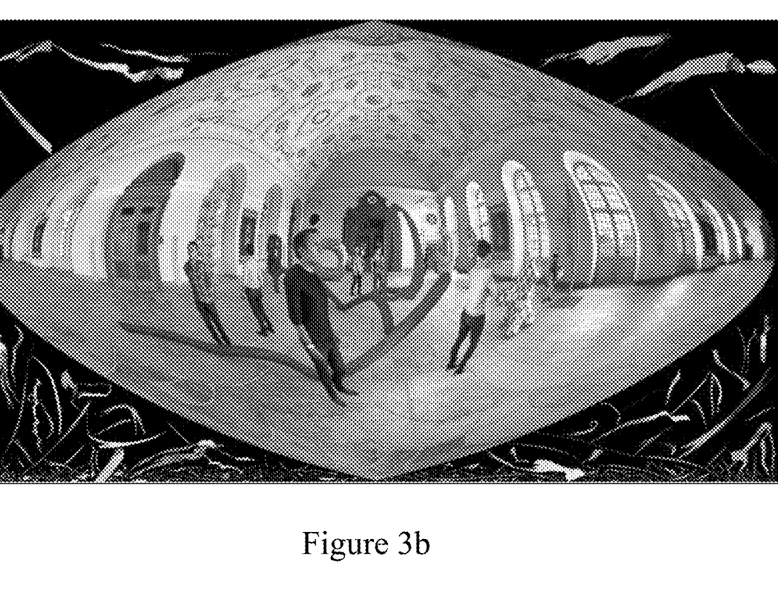
FIG. 3b, shows an image obtained by projecting color points of a sphere onto pixel of the image according the isotropic region guided mapping according to a non-restrictive embodiment of the present principles.

FIG. 3b, shows an image obtained by projecting color points of a sphere onto pixel of the image according the isotropic region guided mapping of the present principles. The isotropic property of such a latter mapping does not totally fill the 2D image plane. As a consequence, the freed space can be used as an extra storage. It is especially advantageous, in the context of the 3 DoF+ video format. As illustrated in FIG. 3a, when the mapping operator is ERP or CMP for instance, the allocation of an extra space is required for the encoding of extra data like depth or color patches. As illustrated in FIG. 3b, with an isotropic region guided mapping, the freed space can be smartly used to store extra data like patches. In addition to the new extra available space, the use of an IRGM projection also allows to enhance the quality of the stored content in a region of interest which is not the case for the other mapping. For example, the male character in black is encoded with a better resolution in image of FIG. 3b than in image of FIG. 3a because he is in the region of interest. The isotropic region guided mapping operator has the advantage to modulate the angular resolution of the pixels of the image as a function of their distance to the region of interest. In another embodiment, for a particular usage, the angular resolution of pixels may increase with the distance to the center of the region of interest.

Figure 4:
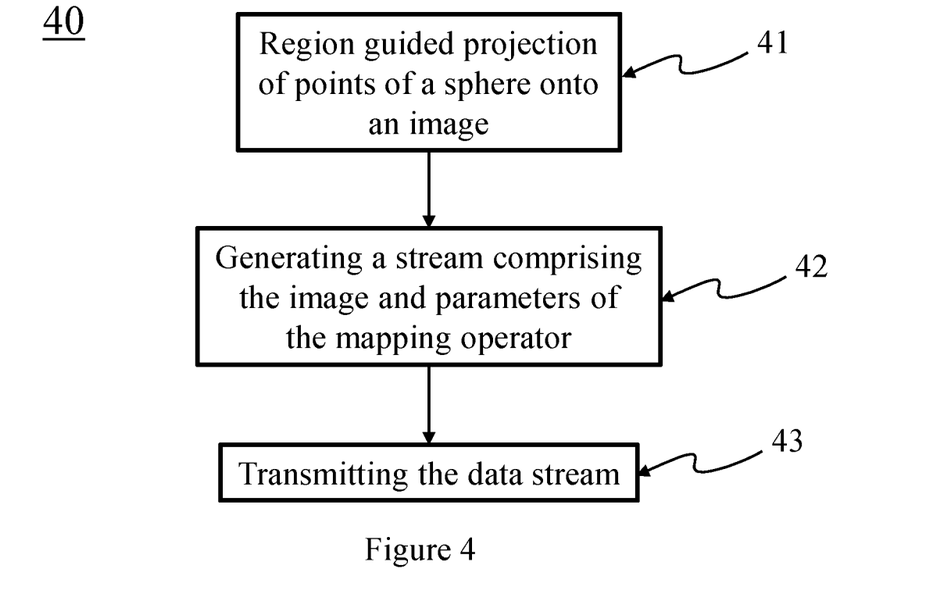
FIG. 4 illustrates a method for projecting points of an area of a sphere onto a pixel of an image, according to an embodiment of the present principles.

FIG. 4 illustrates a method 40 for projecting points of an area of a sphere onto a pixel of an image, according to an embodiment of the present principles. The surface of the area is a function of a distance between the pixel onto which the area is projected and a reference pixel of the image in both dimensions of an image plane. The reference pixel corresponds to the center of a region of interest of the sphere. According to the present principles, the surface of the area projected onto the pixel varies in an isotropic manner according to the determined distance. This distance on the plane of the image corresponds to a distance on the surface of the sphere and/or to an angular distance in the frame of reference of the sphere. The surface of the sphere projected onto a pixel of the image is called elementary surface in the equations above.

In a step 41, an elementary surface is determined for a pixel of the image encoding components of points of the sphere according to the present principles. For example, as illustrated in FIGS. 2b and 3b, points of the sphere, and so pixels of the image, may comprise a color component. In a variant, points of the sphere have a depth component encoding the distance between the center of the sphere and points of a 3D scene which have been projected onto the sphere. In another variant, points of the sphere may comprise several components of different natures, like normal or reflectance vectors. Points comprised in the area of the elementary surface are projected onto the considered pixel. If components of these points have different values, the projected value may be the average of these values or the maximum or minimum value, or any other suitable encoding of the components of points of the determined area.

In a step 42, a stream is generated which embed the image (that is data representative of an image, for example as a grid of pixels) and parameters associated with this image and representative of the mapping operator used to project points of the sphere onto pixels of the image. In a particular embodiment, these parameters comprise data representative of the angular window $[-\Theta,\Theta]\times[-\Phi,\Phi]$, data representative of the angular resolution $\Xi$ at the reference pixel, and data representative of the angular resolution ($=v\Xi$) at pixels corresponding to border of said angular window. In this embodiment, coordinates of the reference pixel are assumed to be standard, so it is not useful to encode them in the stream. For example, the reference pixel is, by default, set at the center of the image. In another embodiment, parameters also comprise coordinates of the reference pixel. These coordinates may be represented as Euclidian coordinates in the plane of the image or as angular coordinates in the frame of reference of the sphere.

Figure 5:
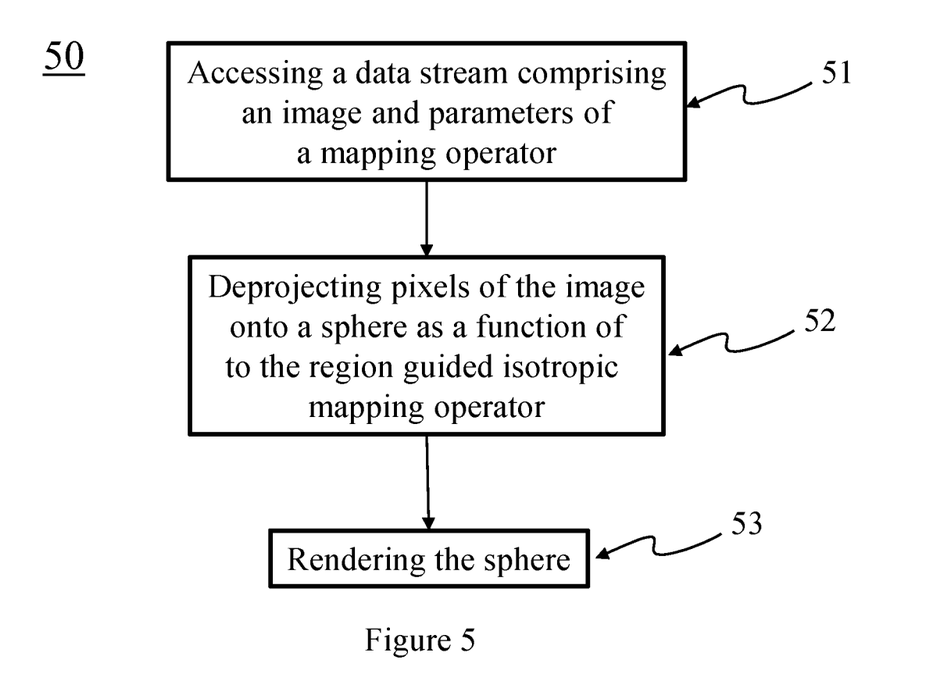
FIG. 5 illustrates a method 50 for de-projecting a pixel of an image onto an area of a sphere, according to an embodiment of the present principles.

In a step 43, the data stream is transmitted, for example through a network, to a decoder implementing the method in relation to FIG. 5.

FIG. 5 illustrates a method 50 for de-projecting a pixel of an image onto an area of a sphere, according to an embodiment of the present principles. The surface of the area onto which the pixel is de-projected is a function of a distance between this pixel and a reference pixel of the image in both dimensions of the image plane. In addition, the surface varies in an isotropic manner according to this distance the two dimensions. This distance may be an Euclidian distance in the plane of the image or an angular distance in the frame of reference of the sphere.

In a step 51, an image is accessed, for example in a stream received via a network or read from a memory. Parameters associated with this image are accessed too. For instance, parameters are encoded as metadata in a data stream comprising the image. These parameters are representative of the mapping operator used to project points of a sphere onto the image. They are used in method 50 to parametrize the inverse mapping operator in order to de-project pixels of the image onto the sphere. These parameters comprise data described in relation to the different embodiments of step 42 of method 40 of FIG. 4. For a pixel of the image, an area is determined on the sphere according to the parametrized mapping operator and components of the pixel are attributed to points of this area.

In a step 52, resulting sphere is used in a rendering module.

Figure 6:
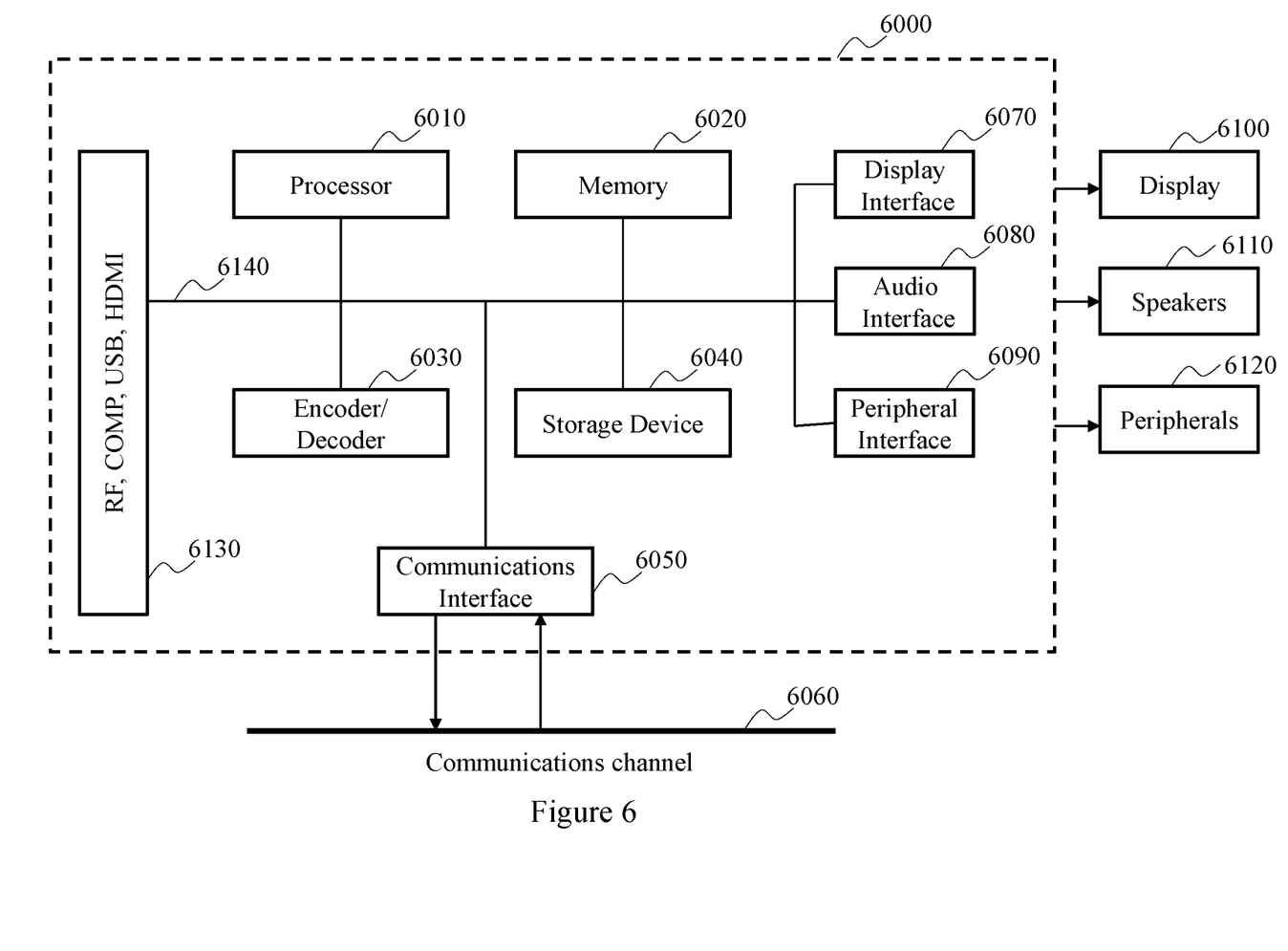
FIG. 6 shows a schematic block diagram illustrating an exemplary system in which various aspects and embodiments are implemented according to a non-restrictive embodiment of the present principle.

FIG. 6 shows a schematic block diagram illustrating an exemplary system in which various aspects and embodiments are implemented. The device of FIG. 6 may be configured to implement a method described in relation with FIGS. 4 and/or 5. The device may be configured to be an encoder or a decoder.

System 6000 can be embodied as a device including the various components described below and is configured to perform one or more of the aspects described in this document. Examples of such equipment include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, can be embodied in a single integrated circuit, multiple ICs, and/or discrete components. For example, in at least one embodiment, the processing and encoder/decoder elements of system 6000 are distributed across multiple ICs and/or discrete components. In various embodiments, the system 6000 is communicatively coupled to other similar systems, or to other electronic devices, via, for example, a communications bus or through dedicated input and/or output ports. In various embodiments, the system 6000 is configured to implement one or more of the aspects described in this document.

The system 6000 includes at least one processor 6010 configured to execute instructions loaded therein for implementing, for example, the various aspects described in this document. Processor 6010 can include embedded memory, input output interface, and various other circuitries as known in the art. The system 6000 includes at least one memory 6020 (for example a volatile memory device and/or a non-volatile memory device). System 6000 includes a storage device 6040, which can include non-volatile memory and/or volatile memory, including, but not limited to, EEPROM, ROM, PROM, RAM, DRAM, SRAM, flash, magnetic disk drive, and/or optical disk drive. The storage device 6040 can include an internal storage device, an attached storage device, and/or a network accessible storage device, as non-limiting examples.

System 6000 includes an encoder/decoder module 6030 configured, for example, to process data to provide an encoded data or decoded data, and the encoder/decoder module 6030 can include its own processor and memory. The encoder/decoder module 6030 represents module(s) that can be included in a device to perform the encoding and/or decoding functions. As is known, a device can include one or both of the encoding and decoding modules. Additionally, encoder/decoder module 6030 can be implemented as a separate element of system 6000 or can be incorporated within processor 6010 as a combination of hardware and software as known to those skilled in the art.

Program code to be loaded onto processor 6010 or encoder/decoder 6030 to perform the various aspects described in this document can be stored in storage device 6040 and subsequently loaded onto memory 6020 for execution by processor 6010. In accordance with various embodiments, one or more of processor 6010, memory 6020, storage device 6040, and encoder/decoder module 6030 can store one or more of various items during the performance of the processes described in this document. Such stored items can include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 6010 and/or the encoder/decoder module 6030 is used to store instructions and to provide working memory for processing that is needed during encoding or decoding.

In other embodiments, however, a memory external to the processing device (for example, the processing device can be either the processor 6010 or the encoder/decoder module 6030) is used for one or more of these functions. The external memory can be the memory 6020 and/or the storage device 6040, for example, a dynamic volatile memory and/or a non-volatile flash memory.

In several embodiments, an external non-volatile flash memory is used to store the operating system of a television. In at least one embodiment, a fast external dynamic volatile memory such as a RAM is used as working memory for video coding and decoding operations, such as for MPEG-2, HEVC (High Efficiency Video coding), or VVC (Versatile Video Coding).

The input to the elements of system 6000 can be provided through various input devices as indicated in block 6030. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 6030 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and de-multiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 6000 to other electronic devices across USB and/or HDMI connections. It is to be understood that various aspects of input processing, for example, Reed-Solomon error correction, can be implemented, for example, within a separate input processing IC or within processor 6010 as necessary. Similarly, aspects of USB or HDMI interface processing can be implemented within separate interface ICs or within processor 6010 as necessary. The demodulated, error corrected, and demultiplexed stream is provided to various processing elements, including, for example, processor 6010, and encoder/decoder 6030 operating in combination with the memory and storage elements to process the data stream as necessary for presentation on an output device.

Various elements of system 6000 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 6000 includes communication interface 6050 that enables communication with other devices via communication channel 6060. The communication interface 6050 can include, but is not limited to, a transceiver configured to transmit and to receive data over communication channel 3060. The communication interface 6050 can include, but is not limited to, a modem or network card and the communication channel 6060 can be implemented, for example, within a wired and/or a wireless medium.

Data is streamed to the system 6000, in various embodiments, using a Wi-Fi network such as IEEE 802.11. The Wi-Fi signal of these embodiments is received over the communications channel 6060 and the communications interface 6050 which are adapted for Wi-Fi communications. The communications channel 6060 of these embodiments is typically connected to an access point or router that provides access to outside networks including the Internet for allowing streaming applications and other over-the-top communications.

Other embodiments provide streamed data to the system 6000 using a set-top box that delivers the data over the HDMI connection of the input block 6030.

Still other embodiments provide streamed data to the system 6000 using the RF connection of the input block 6030.

It is to be appreciated that signaling can be accomplished in a variety of ways. For example, one or more syntax elements, flags, and so forth are used to signal information to a corresponding decoder in various embodiments.

The system 6000 can provide an output signal to various output devices, including a display 6100, speakers 6110, and other peripheral devices 6120. The other peripheral devices 6120 include, in various examples of embodiments, one or more of a stand-alone DVR, a disk player, a stereo system, a lighting system, and other devices that provide a function based on the output of the system 3000.

In various embodiments, control signals are communicated between the system 3000 and the display 6100, speakers 6110, or other peripheral devices 6120 using signaling such as AV.Link, CEC, or other communications protocols that enable device-to-device control with or without user intervention.

The output devices can be communicatively coupled to system 6000 via dedicated connections through respective interfaces 6070, 6080, and 6090.

Alternatively, the output devices can be connected to system 3000 using the communications channel 6060 via the communications interface 6050. The display 6100 and speakers 6110 can be integrated in a single unit with the other components of system 6000 in an electronic device such as, for example, a television.

In various embodiments, the display interface 6070 includes a display driver, such as, for example, a timing controller (T Con) chip.

The display 6100 and speaker 6110 can alternatively be separate from one or more of the other components, for example, if the RF portion of input 6130 is part of a separate set-top box. In various embodiments in which the display 6100 and speakers 6110 are external components, the output signal can be provided via dedicated output connections, including, for example, HDMI ports, USB ports, or COMP outputs.

The invention claimed is:

1. A method comprising projecting points of an area of a sphere onto a pixel of an image, surface of the area being a function of a distance between the pixel and a reference pixel of the image in both dimensions of an image plane, wherein the reference pixel is a projection of a reference point and wherein the surface varies according to a continuous spherical mapping operator that is a function of:
   coordinates of the reference pixel corresponding to a center of a region of interest defined by the continuous spherical mapping operator,
   an angular window around the reference point,
   an angular resolution at the reference pixel,
   an angular resolution at pixels corresponding to border of the angular window.

2. The method of claim 1, wherein the points of the sphere are associated to a color component and/or to a depth component, the component being encoded in pixels of the image.

3. The method of claim 1, comprising generating a stream, the stream comprising the image and parameters associated with the image, the parameters comprising:
   data representative of the angular window,
   data representative of the angular resolution at the reference pixel, and
   data representative of the angular resolution at pixels corresponding to border of the angular window.

4. The method of claim 3, wherein said parameters further comprise coordinates of the reference pixel.

5. A device comprising a processor configured to project points of an area of a sphere onto a pixel of an image, surface of the area being a function of a distance between the pixel and a reference pixel of the image in both dimensions of an image plane, wherein the reference pixel is a projection of a reference point and wherein the surface varies according to a continuous spherical mapping operator that is a function of:
   coordinates of the reference pixel corresponding to a center of a region of interest defined by the continuous spherical mapping operator,
   an angular window around the reference point,
   an angular resolution at the reference pixel,
   an angular resolution at pixels corresponding to border of the angular window.

6. The device of claim 5, wherein the points of the sphere are associated to a color component and/or to a depth component, the component being encoded in pixels of the image.

7. The device of claim 5, wherein the processor is configured for generating a stream, the stream comprising the image and parameters associated with the image, the parameters comprising:
   data representative of the angular window,
   data representative of the angular resolution at the reference pixel, and
   data representative of the angular resolution at pixels corresponding to border of the angular window.

8. The device of claim 7, wherein said parameters further comprise coordinates of the reference pixel.

9. A method comprising de-projecting a pixel of an image onto an area of a sphere, surface of the area being a function of a distance between the pixel and a reference pixel of the image in both dimensions of an image plane, wherein the reference pixel is a projection of a reference point and wherein the surface varies according to a continuous spherical mapping operator that is a function of:
   coordinates of the reference pixel corresponding to a center of a region of interest defined by the continuous spherical mapping operator,
   an angular window around the reference point,
   an angular resolution at the reference pixel,
   an angular resolution at pixels corresponding to border of the angular window.

10. The method of claim 9, wherein the pixels of the image encode a color component and/or to a depth component, the component being de-projected onto the area of the sphere.

11. The method of claim 9, comprising accessing the image and parameters from a stream, the stream comprising the image and parameters associated with the image, the parameters comprising:
   data representative of the angular window,
   data representative of the angular resolution at the reference pixel, and
   data representative of the angular resolution at border of the angular window.

12. The method of claim 11, wherein said parameters further comprise coordinates of the reference pixel.

13. A device comprising a processor configured for de-projecting a pixel of an image onto an area of a sphere, surface of the area being a function of a distance between the pixel and a reference pixel of the image in both dimensions of an image plane, wherein the reference pixel is a projection of a reference point and wherein the surface varies according to a continuous spherical mapping operator that is a function of:
   coordinates of the reference pixel corresponding to a center of a region of interest defined by the continuous spherical mapping operator,
   an angular window around the reference point,
   an angular resolution at the reference pixel,
   an angular resolution at pixels corresponding to border of the angular window.

14. The device of claim 13, wherein the pixels of the image encode a color component and/or to a depth component, the component being de-projected onto the area of the sphere.

15. The device of claim 13, wherein the processor is configured for accessing the image and parameters from a stream, the stream comprising the image and parameters associated with the image, the parameters comprising:
   data representative of the angular window,
   data representative of the angular resolution at the reference pixel, and
   data representative of the angular resolution at border of the angular window.

16. The device of claim 15, wherein the parameters further comprise coordinates of the reference pixel.

* * * * *